UNITED STATES PATENT OFFICE.

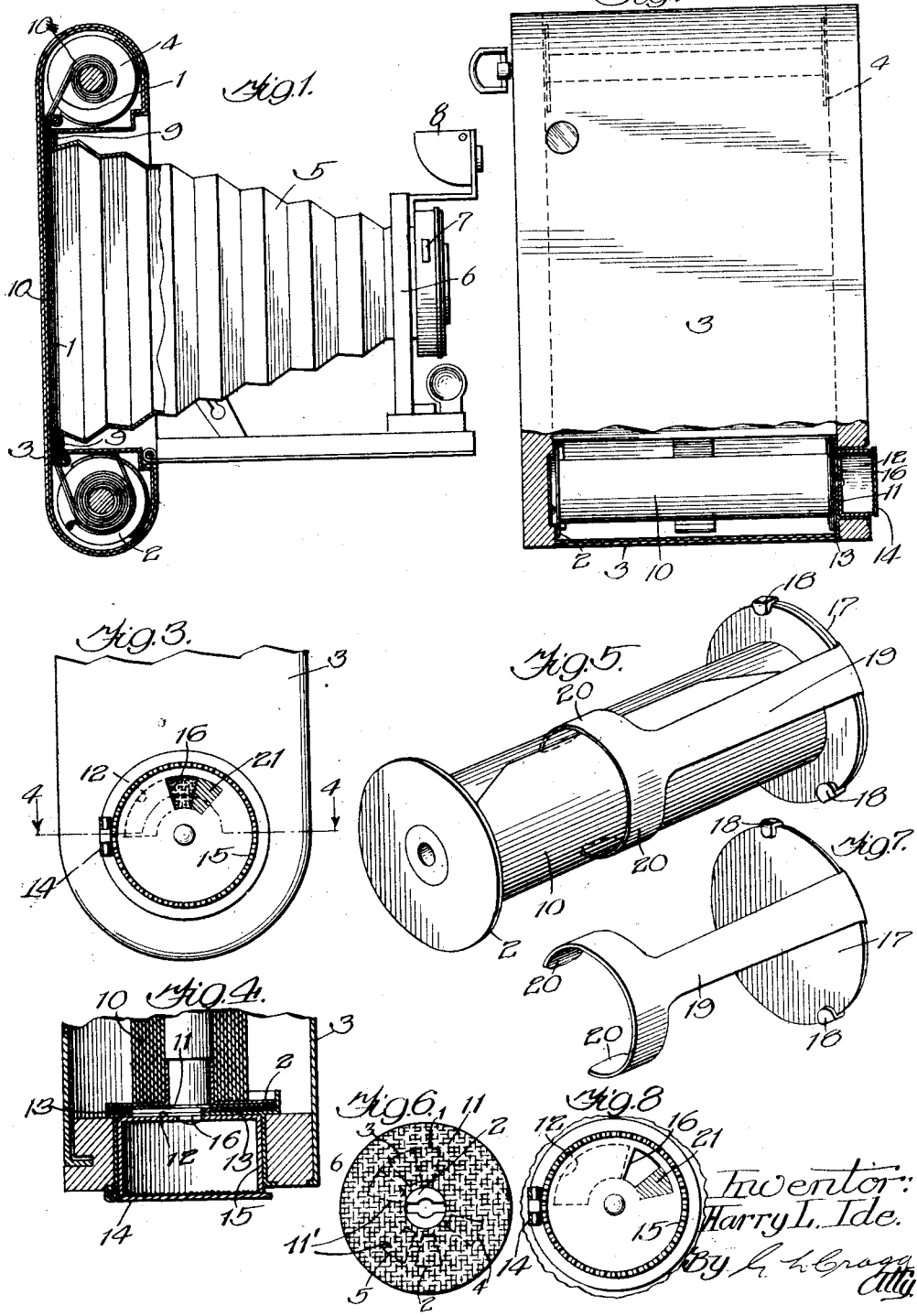

HARRY L. IDE, OF SPRINGFIELD, ILLINOIS, ASSIGNOR OF ONE-HALF TO ROY W. IDE, OF SPRINGFIELD, ILLINOIS.

PHOTOGRAPHIC CAMERA.

1,212,355.    Specification of Letters Patent.    Patented Jan. 16, 1917.

Application filed March 15, 1916. Serial No. 84,274.

*To all whom it may concern:*

Be it known that I, HARRY L. IDE, citizen of the United States, residing at Springfield, in the county of Sangamon and State of Illinois, have invented a certain new and useful Improvement in Photographic Cameras, of which the following is a full, clear, concise, and exact description, reference being had to the accompanying drawings, forming a part of this specification.

My invention relates to that form of photographic camera which employs a film for producing photographic negatives and which film is wound upon a supply spool removably inserted at one end of the camera case and from which supply spool the film is led to a winding spool which is usually a previously employed supply spool. In conjunction with this structure I use an actinic light metering device that employs a revoluble element coupled with or carried by one of these spools and desirably co-axial therewith, this revoluble element being provided with a sensitized testing surface having portions for successive presentation to an opening in the camera case, there to be acted upon by actinic light, whereby the duration of exposure may be determined. As the invention is preferably practised the sensitized surface is disposed upon the outer end face of one of the spool heads and the area of such sensitized surface is divided, preferably by imaginary lines, into portions which are respectively individual to the negative producing sections of the film which are thus coupled therewith through the intermediation of the supply spool, though the invention is not to be thus limited.

I will explain my invention more fully by reference to the accompanying drawing showing the preferred embodiment thereof and in which—

Figure 1 is a view in elevation, partially in section, of a camera equipped in accordance with the invention; Fig. 2 is a rear view of the camera, partially in section; Fig. 3 is a side view of the lower part of the structure shown in Fig. 2 illustrating a testing portion in exposure position; Fig. 4 is a sectional view on line 4 4 of Fig. 3; Fig. 5 is a perspective view of a roll of film and a shield carried thereby before the film is loaded for protecting the sensitized testing element from the action of actinic light; Fig. 6 is an end view of that end of a spool which carries the sensitized testing element; Fig. 7 is a perspective view further illustrating the light shield shown in Fig. 5; and Fig. 8 is a view illustrating a non-testing adjustment of parts shown in Fig. 3.

Like parts are indicated by similar characters of reference throughout the different figures.

The sensitized elements that are to form the photographic negatives are embodied in a flexible element 1 commonly called a film which is supplied to the user on a supply spool 2 that is removably inserted in the lower end of the camera casing 3 and from which supply spool the film is led to the winding or receiving spool 4. In the form of camera selected for the purpose of illustrating the invention there is included a bellowslike element 5 which tapers to its forward end at which it is connected with the camera "front" that is provided with the usual lens (of which the frame 6 is shown), the shutter, of which finger lever 7 is shown, and finder 8, all as is well understood by those familiar with the art. The rear of the bellowslike element 5, as is well known, is attached to the border portion 9 of the casing 3 and defines, with the border portion 9, the extent of the area of the film which is to be exposed to the light in photographic operation.

The film is backed by a sheet or tape of paper 10 which is of such a color, say black, or has a combination of colors, to prevent the light from striking through the film to the front or sensitized surface thereof. The ribbons or sheets 1 and 10 are wound together upon the supply spool 2 and are wound together from the supply spool upon the winding spool 4, all as is well known by those familiar with the art. Each film is of such length as to furnish a number of negatives, the sensitized portions coupled with each spool that are provided for testing the actinic light value (which sensitized portions are desirably individual to the negative producing portions of the film 1) being merged in a single disk 11 carried by the associate spool preferably on an outer end face of one of the heads thereof. The sensitized portion upon the spool which happens to be the supply spool is disposed beneath the actinic light conveying opening or passage 12 in the camera case at which opening is successively exposed the successive sensitized testing portions of the element 11. The radial lines 11¹ indicate the imaginary lines separating the sensitized testing portions. A light shield 13 margins the opening 12 and serves to prevent the access of light to any of the testing portions not to be exposed. A light closure or lid 14 normally prevents the access of actinic light to the opening or passage 12, this closure being opened whenever the actinic value of the light in which an exposure is to be made is to be determined.

In practice, the sensitized disks are preferably permanently coupled with the spools directly; by which is meant that such coupling is not effected through the intermediation of the film 1 or backing strip 10 but independently of the spool contents altogether, the spool acting to couple the sensitized portions with the negative producing sections to which such portions are desirably individual.

To provide for inequalities in the winding and other minor inaccuracies, I desirably make the arcual slot 12 of considerably greater length than the portions of the testing element 11 that are to be individually exposed to the action of actinic light and when this construction is employed the closure lid 14 is desirably mounted upon a cylindrical body or barrel 15 whose bottom constitutes a portion of the casing and has an opening or actinic light conveying passage 16 of an area corresponding to the area of each sensitized testing portion that is to be exposed. This barrel is revolubly mounted so that the position of the opening or passage 16 may readily be shifted to overlie differing portions of the opening 12 to insure the employment of an unexposed testing portion whenever a fresh test is to be made. When there is no test to be made the lid 14 may be closed to prevent the access of light through the opening 16 and the opening 12 to the underlying testing element 11. The barrel, also, may be turned to bring the opening 16 totally out of register with the opening 12, thus supplementing the function of the lid 14.

The sensitized testing element, before the application of the supply spool carrying it to a camera, is normally protected by a light shield 17 having clips 18 which hold it in place upon the spool head. This shield desirably has an inwardly projecting finger 19 overlying the rolled film which will necessitate its removal and the consequent removal of the shield 17 coupled with the finger before the film may readily be connected with the winding spool. This removal of the finger and the light shield attached thereto is effected after the supply spool is placed in its pocket in the camera case and before the film is coupled with the winding spool, so that the sensitized testing element will not be prematurely exposed.

The finger 19 may be of spring metal and may be bifurcated as indicated at 20 to constitute spring prongs which will grasp the roll of film to hold the outer tab end thereof in position without the aid of a paster which is now commonly employed.

The disks 11 may be made of sensitized paper similar to that which is employed in the exposure meters furnished by Adams & Co., 24 Charing road, London.

I employ a standard tint 21 to which the tint of an exposed sensitized testing portion is to turn in determining actinic light value. This standard tint desirably margins the opening 16. The number of seconds or minutes or divisions thereof required to bring the changeable tint of the exposed actinic light value testing portion to the standard tint measures the actinic light value, and the duration of the picture taking exposure is governed according to this value thus determined in the testing operation and also according to the size of the lens aperture which is selected in the photographic operation, as will be well understood by those familiar with the art, there being devices upon the market which will guide the user in determining the duration of exposure with differing sizes of lens openings after the actinic light value has been determined as herein set forth.

While I have herein shown and particularly described the preferred embodiment of my invention I do not wish to be limited to the precise details of construction shown as changes may readily be made without departing from the spirit of my invention, but

Having thus described my invention I claim as new and desire to secure by Letters Patent the following:—

1. A camera of the roll film type including a casing; supply and winding film spools in the casing, the casing having an actinic light conveying passage; and a sensitized element for testing actinic light value coupled with a spool independently of the spool contents whereby successive portions thereof are brought to exposure position at the aforesaid passage.

2. A camera of the roll film type including a casing; supply and winding film spools in the casing, the casing having an actinic light conveying passage, the part of the casing having this passage being changeable in position to enable the adjustment of the location of said passage in the casing; and a sensitized element for testing actinic light value coupled with a spool independently of the spool contents whereby successive portions thereof are brought to exposure position at the aforesaid passage.

3. A camera of the roll film type including a casing; supply and winding film spools in the casing, the casing having an actinic light conveying passage at a spool head; and a sensitized element for testing actinic light value and carried by the spool head located at said passage whereby successive portions of the sensitized testing element are brought to exposure position at the aforesaid passage by the turning of the spool carrying said testing element.

4. A camera of the roll film type including a casing; supply and winding film spools in the casing, the casing having an actinic light conveying passage at a spool head, the part of the casing having this passage being changeable in position to enable the adjustment of the location of said passage in the casing; and a sensitized element for testing actinic light value and carried by the spool head located at said passage whereby successive portions of the sensitized testing element are brought to exposure position at the aforesaid passage.

In witness whereof, I hereunto subscribe my name this eighth day of March, A. D. 1916.

HARRY L. IDE.

Witnesses:
G. L. CRAGG,
ETTA L. WHITE.

Copies of this patent may be obtained for five cents each, by addressing the "Commissioner of Patents, Washington, D. C."